US010929744B2

(12) United States Patent
Li et al.

(10) Patent No.: US 10,929,744 B2
(45) Date of Patent: Feb. 23, 2021

(54) FIXED-POINT TRAINING METHOD FOR DEEP NEURAL NETWORKS BASED ON DYNAMIC FIXED-POINT CONVERSION SCHEME

(71) Applicant: XILINX TECHNOLOGY BEIJING LIMITED, Beijing (CN)

(72) Inventors: Xin Li, Beijing (CN); Tong Meng, Beijing (CN); Song Han, Beijing (CN)

(73) Assignee: XILINX TECHNOLOGY BEIJING LIMITED, Beijing (CN)

( * ) Notice: Subject to any disclaimer, the term of this patent is extended or adjusted under 35 U.S.C. 154(b) by 811 days.

(21) Appl. No.: 15/693,490

(22) Filed: Sep. 1, 2017

(65) Prior Publication Data

US 2019/0034784 A1 Jan. 31, 2019

(30) Foreign Application Priority Data

Jul. 28, 2017 (CN) ........................ 201710629391.7

(51) Int. Cl.

*G06N 3/04* (2006.01)
*G06N 3/08* (2006.01)
*G06N 3/063* (2006.01)
*G06N 7/00* (2006.01)

(52) U.S. Cl.

CPC ......... *G06N 3/0445* (2013.01); *G06N 3/0454* (2013.01); *G06N 3/0481* (2013.01); *G06N 3/063* (2013.01); *G06N 3/08* (2013.01); *G06N 3/084* (2013.01); *G06N 3/082* (2013.01); *G06N 7/005* (2013.01)

(58) Field of Classification Search

CPC .... G06N 3/0445; G06N 3/063; G06N 3/0481; G06N 3/0454; G06N 3/084; G06N 3/08; G06N 3/082; G06N 7/005; G10L 15/16

See application file for complete search history.

(56) References Cited

U.S. PATENT DOCUMENTS

| | | | | |
|---|---|---|---|---|
| 2010/0123525 A1* | 5/2010 | Roithmeier | ............... | H03J 3/04 331/36 C |
| 2017/0220929 A1* | 8/2017 | Rozen | .................... | G06N 3/063 |
| 2020/0135178 A1* | 4/2020 | Park | ........................ | G06F 21/32 |

OTHER PUBLICATIONS

Gupta et al., Deep Learning with Limited Numerical Precision, Proceedings of the 32nd International Conference on Machine Learning, pp. 1-8 (Year: 2015).*

FxpNet: Training a deep convolutional neural network in fixed-point representation, 2017 International Joint Conference on Neural Networks (IJCNN), DOI: 10.1109/IJCNN.2017.7966159.

* cited by examiner

*Primary Examiner* — Shane D Woolwine
(74) *Attorney, Agent, or Firm* — IPro, PLLC

(57) ABSTRACT

The present disclosure proposes a fixed-point training method and apparatus based on dynamic fixed-point conversion scheme. More specifically, the present disclosure proposes a fixed-point training method for LSTM neural network. According to this method, during the fine-tuning process of the neural network, it uses fixed-point numbers to conduct forward calculation. Accordingly, within several training cycles, the network accuracy may returned to the desired accuracy level under floating point calculation.

21 Claims, 11 Drawing Sheets

```
<AdaptiveFixedPoint>
<Model>
<BitNumParam>
<Component> 0 <dim> 13 <val> 12 12 12 12 12 12 12 12 16 16 16 16 12 </val>
<BitNumParam>
<Component> 1 <dim> 13 <val> 12 12 12 12 12 12 12 12 16 16 16 16 12 </val>
<BitNumParam>
<Component> 2 <dim> 13 <val> 12 12 12 12 12 12 12 12 16 16 16 16 12 </val>
<BitNumParam>
<Component> 3 <dim> 2 <val> 12 16 </val>
<BitNumBlob>
<Layer> 0 <dim> 1 <val> 16 </val>
<BitNumBlob>
<Layer> 1 <dim> 3 <val> 16 16 16 </val>
<BitNumBlob>
<Layer> 2 <dim> 3 <val> 16 16 16 </val>
<BitNumBlob>
<Layer> 3 <dim> 3 <val> 16 16 16 </val>
<BitNumBlob>
<Layer> 4 <dim> 1 <val> 16 </val>
<FragPosParam>
<Component> 0 <dim> 13 <val> 5 9 9 5 11 12 12 11 6 14 13 13 10 </val>
<FragPosParam>
<Component> 1 <dim> 13 <val> 11 11 12 11 12 12 12 12 8 14 14 14 11 </val>
<FragPosParam>
<Component> 2 <dim> 13 <val> 12 12 11 12 12 12 12 12 8 14 14 13 11 </val>
<FragPosParam>
<Component> 3 <dim> 2 <val> 11 9 </val>
<FragPosBlob>
<Layer> 0 <dim> 1 <val> 10 </val>
<FragPosBlob>
<Layer> 1 <dim> 3 <val> 6 6 6 </val>
<FragPosBlob>
<Layer> 2 <dim> 3 <val> 8 8 8 </val>
<FragPosBlob>
<Layer> 3 <dim> 3 <val> 8 8 8 </val>
<FragPosBlob>
<Layer> 4 <dim> 1 <val> 9 </val>
<NonLinearSigmoid>
<x_range> 8 <n_points> 2048 <Expo> 15
<NonLinearTanh>
<x_range> 4 <n_points> 2048 <Expo> 15
```

Fig. 8

FIXED-POINT TRAINING METHOD FOR DEEP NEURAL NETWORKS BASED ON DYNAMIC FIXED-POINT CONVERSION SCHEME

CROSS REFERENCE TO RELATED APPLICATIONS

This application claims priority to Chinese Patent Application Number 201710629391.7 filed on Jul. 28, 2017, the entire contents of which are incorporated herein by reference.

TECHNICAL FIELD

The present disclosure relates to a fixed-point training method and apparatus applied in deep neural networks, and in particular, to a novel dynamic fixed-point conversion scheme applied in LSTM neural networks.

BACKGROUND ART

Artificial Neural Networks

Artificial Neural Networks (ANNs), also called NNs, are a distributed parallel information processing models which imitate behavioral characteristics of animal neural networks. In recent years, studies of ANNs have achieved rapid developments, and ANNs have been widely applied in various fields, such as image recognition, speech recognition, natural language processing, gene expression, contents pushing, etc.

In neural networks, there exists a large number of nodes (also called "neurons") which are connected to each other. Each neuron calculates the weighted input values from other adjacent neurons via certain output function (also called "Activation Function"), and the information transmission intensity between neurons is measured by the so-called "weights". Such weights might be adjusted by self-learning of certain algorithms.

Early neural networks have only two layers: the input layer and the output layer. Thus, these neural networks cannot process complex logic, limiting their practical use.

FIG. 1 shows a schematic diagram of a deep neural network. As shown in FIG. 1, deep neural networks (DNNs) have revolutionarily addressed the above-mentioned defect by adding a hidden intermediate layer between the input layer and the output layer, improving network performance in handling complex problems.

In order to adapt to different application scenarios, different neutral network structures have been derived from conventional deep neural network. For example, Recurrent Neural Network (RNN) is a commonly used type of deep neural network. Different from conventional feed-forward neural networks, RNNs have introduced oriented loop and are capable of processing forward-backward correlations between inputs. A neuron may acquire information from neurons in the previous layer, as well as information from the hidden layer where said neuron locates. Therefore, RNNs are particularly suitable for sequence related problems.

The deployment of deep neural networks generally includes two phases: the training phase and the inference phase.

The purpose of training a neural network is to improve the learning ability of the network. More specifically, the network calculates the prediction result of an input feature via forward calculation, and then compares the prediction result with a standard answer. The difference between the prediction result and the standard answer will be sent back to the network via a backward propagation. The weights of the network will then be updated using said difference.

Once the training process is completed, the trained neural network may be applied for actual scenarios. That is, the inference phase will start. In this phase, the network will calculate a reasonable prediction result on the basis of an input feature via forward calculation.

In recent years, the scale of neural networks is exploding due to rapid developments. Some of the advanced neural network models might have hundreds of layers and billions of connections, and the implementation thereof is both calculation-centric and memory-centric. Since neural networks are becoming larger, it is critical to compress neural network models to smaller scale. However, as the accuracy of the neural network after compression may decrease, retraining (also refer to as "fine-tuning") the compressed neural network is needed, so as to regain the desired accuracy.

More specifically, compression of deep neural networks may be divided to two parts: (1) sparsification of the neural network, and (2) reducing bit by quantization (referred as "lower bit quantization").

Firstly, in deep neural networks, connection relations between neurons can be expressed mathematically as a series of matrices. Although a well-trained neural network is accurate in prediction, its matrices are dense matrices. In other words, the matrices are filled with non-zero elements. Therefore, dense neural networks may be compressed to sparse neural networks before being used. Studies show that in the matrix of a trained neural network model, elements with larger weights represent important connections, while other elements with smaller weights have relatively small impact and can be removed (e.g., set to zero). Thus, low-weight connections are pruned, converting a dense network to a sparse network.

Secondly, computation of the weights of neural networks on conventional hardware platforms, such as CPU, uses 32-bit floating point numbers. Representing weight parameters with such many bits may consume large amount of storage and computing resources. Studies show that it is possible to reduce the computational and storage consumption by representing weight parameters with less bit number, in particular, by replacing floating point number with fixed-point number in forward calculation.

Speech Recognition

Speech recognition is to sequentially map analogue signals of a language to a specific set of words.

In conventional speech recognition systems, it extracts the features of a speech input first, and then outputs the recognition results using a decoder.

More specifically, feature extraction at the front end generally includes signal processing and model construction, wherein signal processing further includes steps such as voice activity detection, pre-processing, feature extraction and feature transformation, and the model is constructed using the Hidden Markov Model (HMM) so as to calculate the probability of a corresponding text.

The decoder at the back end generally includes decoding network construction and searching of optimal path. It outputs the final recognition results in combine with acoustic model and language model.

In recent years, deep neural networks have been widely applied in speech recognition field, wherein deep learning models are mainly used in predicting the acoustic output probability at the back end. Speech recognition is characterized in that there are strong forward-backward correlations between signals. For example, one word is closely related to its preceding word in a series of voice signals. Deep neural networks (for example, RNNs) may address this problem by introducing directional loops, and are therefore widely applied in speech recognition.

FIG. 2 shows an example of a speech recognition engine using deep neural networks. In the model shown in FIG. 2, it calculates the acoustic output probability using a deep learning model. In other words, it calculates the degree of similarity between input speech signals and various possible candidates.

FIGS. 3*a* and 3*b* show a deep learning model applied in the speech recognition engine of FIG. 2. The deep learning model shown in FIG. 3*a* includes a CNN (Convolutional Neural Network) module, a LSTM (Long Short-Term Memory) module, a DNN (Deep Neural Network) module, a Softmax module, etc. The deep learning model shown in FIG. 3*b* includes multi-layers of LSTM models.

LSTM

In order to solve long-term information storage problem, Hochreiter & Schmidhuber has proposed the Long Short-Term Memory (LSTM) model in 1997.

LSTM network is one type of RNN. The main difference between RNNs and DNNs lies in that RNNs are time-dependent. Specifically, the input at time T depends on the output at time T−1. That is, calculation of the current frame depends on the calculated result of the previous frame. Moreover, LSTM network changes simple repetitive neural network modules in normal RNN to complex interconnecting relations. LSTM neural network has achieved very good effect in speech recognition.

For more details of LSTM, prior art references can be made mainly to the following two published papers: Salk H, Senior A W, Beaufays F. Long short-term memory recurrent neural network architectures for large scale acoustic modeling[C]/INTERSPEECH. 2014: 338-342; Sak H, Senior A, Beaufays F. Long short-term memory based recurrent neural network architectures for large vocabulary speech recognition[J]. arXiv preprint arXiv:1402.1128, 2014.

FIG. 4 shows a LSTM network model applied in speech recognition. In the LSTM architecture of FIG. 4:

- Symbol i represents the input gate i which controls the flow of input activations to the memory cell;
- Symbol o represents the output gate o which controls the output flow of cell activations to the rest of the network;
- Symbol f represents the forget gate which scales the internal state of the cell before adding it as input to the cell, therefore adaptively forgetting or resetting the cell's memory;
- Symbol g represents the characteristic input of the cell;
- The bold lines represent the output of the previous frame;
- Each gate has a weight matrix, and the computation amount for the input at time T and the output at time T−1 at the gates is relatively intensive;
- The dashed lines represent peephole connections, and the operations correspond to the peephole connections and the three cross-product signs are element-wise operations, which require relatively little computation amount.

FIG. 5 shows an improved LSTM network model applied in speech recognition. As shown in FIG. 5, in order to reduce the computation amount of the LSTM layer, an additional projection layer is introduced to reduce the dimension of the model.

The equations corresponding to the LSTM network model shown in FIG. 5 are as follows (assuming that the LSTM network accepts an input sequence $x=(x_1, \ldots, x_T)$, and computes an output sequence $y=(y_1, \ldots, y_T)$ by using the following equations iteratively from t=1 to T):

$$i_t=\sigma(W_{ix}x_i+W_{ir}y_{t-1}+W_{ic}c_{t-1}+b_i)$$

$$f_t=\sigma(W_{fx}x_t+W_{fr}y_{t-1}+W_{fc}c_{t-1}+b_f)$$

$$c_t=f_t\odot c_{t-1}+i_t\odot g(W_{cx}x_t=W_{cr}y_{t-1}+b_c)$$

$$o_t=\sigma(W_{ox}x_t+W_{or}y_{t-1}+W_{oc}c_t+b_o)$$

$$m_t=o_t\odot h(c_t)$$

$$y_t=W_{ym}m_t$$

Here, σ( ) represents the activation function sigmoid. W terms denote weight matrices, wherein $W_{ix}$ is the matrix of weights from the input gate to the input, and $W_{ic}$, $W_{fc}$, $W_{oc}$, are diagonal weight matrices for peephole connections which correspond to the three dashed lines in FIG. 5. Operations relating to the cell are multiplications of vector and diagonal matrix.

The b terms denote bias vectors ($b_i$ is the gate bias vector). The symbols i, f, o, c are respectively the input gate, forget gate, output gate and cell activation vectors, and all of which are the same size as the cell output activation vectors m. ⊙ is the element-wise product of the vectors, g and h are the cell input and cell output activation functions, generally tan h.

Using the above equations, all of the parameters in one LSTM layer may be obtained. The parameters includes: the four weight matrices $W_{ix}$, $W_{fx}$, $W_{cx}$, $W_{ox}$ which are calculated with the input; the four weight matrices $W_{ir}$, $W_{fr}$, $W_{cr}$, $W_{or}$ which are calculated with the output of the previous frame; the three peepholes which are calculated with the cell; the matrix $W_{ym}$ used for reducing dimension; and the four bias vectors $b_i$, $b_f$, $b_c$, $b_o$.

The size of an LSTM network is usually expressed by the input dimension×cell dimension×output dimension. Specifically, the input dimension is the dimension of the input vector x, the output dimension is the dimension of the output vector y, and the cell dimension is the dimension of the result generated during intermediate computation, i.e. the number of rows of the weight matrix.

Training and Fine-Tuning of ANNs

The training and fine-tuning process of a neural network is a process for optimizing a loss function. A loss function refers to the difference between the ideal result and the actual result of a neural network model given a predetermined input. It is therefore desirable to minimize the value of a loss function.

Training a neural network aims at finding the optimal solution. Fine-tuning a neural network aims at finding the optimal solution based on a suboptimal solution, i.e., fine-tuning is to continue to train the neural network on certain basis.

For example, for a trained LSTM neural network, we consider the trained network as the optimal solution. After being compressed, training the compressed network based on the remaining weights to find the optimal solution is the fine-tuning process.

Generally, Gradient Descent Algorithm is used during the training/fine-tuning process to update the weight matrix.

More specifically, if real-value function F(x) is differentiable and has definition at point a, then F(x) descents the fastest along $-\nabla F(a)$ at point a.

Thus, if:

$$b=a-\gamma\nabla F(a)$$

is true when $\gamma>0$ is a value that is small enough, then $F(a)\geq F(b)$, wherein a is a vector.

In light of this, we can start from $x_0$ which is the local minimal value of function F, and consider the following sequence $x_0, x_1, x_2, \ldots$, so that:

$$x_{n+1}=x_n-\gamma_n\nabla F(x_n),\ n\geq 0$$

Thus, we can obtain:

$$F(x_0)\geq F(x_1)\geq F(x_2)\geq \ldots$$

Desirably, the sequence $(x_n)$ will converge to a desired extreme value. It should be noted that in each iteration, step $\gamma$ can be changed.

Here, F(x) can be interpreted as a loss function. In this way, Gradient Descent Algorithm can be used to help reducing prediction loss.

For example, with reference to "DSD: Regularizing Deep Neural Networks with Dense-Sparse-Dense Training Flow in NIPS 2016", the fine-tuning method of LSTM neural network is as follows:

| Initial Dense Phase |
| --- |
| while not converged do<br>\| $\tilde{W}^{(t)} = W^{(t-1)} - \eta^{(t)}\nabla f(W^{(t-1)};x^{(t-1)})$;<br>\| t = t + 1;<br>end |

Here, W refers to the weight matrix, $\eta$ refers to learning rate (i.e., the step of the Gradient Descent Algorithm), f refers to a loss function, $\nabla F$ refers to gradient of the loss function, x refers to training data, and t+1 refers to weight update.

The above equations mean that the new weight matrix is updated by subtracting the product of a learning rate and a gradient of the loss function from the old weight matrix.

FIG. 6 is a schematic diagram showing the training/fine-tuning process of a neural network using the Gradient Descent Algorithm.

As shown in FIG. 6, first, conducting a forward calculation via the original neural network using the training data, and comparing the calculated result with a standard value to obtain the loss. Then, conducting a backward calculation based on this loss to obtain a gradient matrix. Lastly, updating the original neural network using the gradient matrix and a predetermined learning rate.

In practice, considering computational efficiency, multiple pieces of training data may be used together for one forward calculation and one backward calculation, so as to update the weight parameters of the neural network. This process is considered as one iteration within one epoch (i.e. a training cycle).

Since there might be thousands of pieces of training data in one training set, a plurality of iterations may be conducted. Each time after a group of training data is used, an epoch of training is completed. In the next epoch, data will again be extracted from the same training set, and the same training process of forward calculation, backward calculation and update will be conducted.

Fixed-Point Conversion of Floating Point Numbers

As mentioned above, compression of deep neural networks may be divided to two parts: sparsification of the neural network, i.e., compression of the neural network by pruning operations; and fixed-bit quantization, i.e., conversion of floating point numbers to fixed-point numbers.

Generally, in GPU/CPU, it uses 32-bit floating point numbers to represent data and conduct computation. In order to save resources and improve computation speed, hardware platforms tend to use numbers with lower bits, such as 16-bit fixed-point numbers, to represent data and conduct computation.

Fixed-point conversion refers to a process of determining bit width and specifying the position of decimal point so as to represent the data.

FIG. 7 is a simplified schematic diagram showing the fixed-point conversion of floating point numbers.

More specifically, fixed-point conversion includes: 1) determining bit width, such as 8 bit, 16 bit, etc.; and 2) specifying the position of decimal point, that is, selecting the position of decimal point according to actual needs, for example to ensure that the integer part does not overflow.

For a neural network, the object to be converted may be the network itself. The time cost for converting the parameters of a neural network is relatively small, and the conversion may be completed in one round of quantization.

The object to be converted may also be the forward calculation process. The time cost for converting parameters/computation results generated during the forward calculation process is relatively high, and the conversion may need to be completed in several rounds of quantization.

Since floating point numbers are represented by their approximate values after fixed-point conversion, computation using fixed-points often results in lower accuracy, affecting the performance of the neural network. However, by selecting appropriate conversion scheme and by fixed-point training, the network may adapt to fixed-point computation, which compensates the accuracy loss due to fixed-point conversion. In this way, the neural network may be compressed to a target compression ratio, while maintaining a desired accuracy.

Therefore, the present disclosure aims at proposing a fixed-point training method for deep neural networks. The proposed method may compensate for the accuracy loss due to fixed-point calculations, so that the computation speed of the neural network may increase without affecting the accuracy of the network.

SUMMARY

The present disclosure proposes a fixed-point training method and apparatus based on dynamic fixed-point conversion scheme. More specifically, the present disclosure proposes a fixed-point training method for LSTM neural network. According to this method, during the fine-tuning process of the neural network, it uses fixed-point numbers to conduct forward calculation. In this way, within several training cycles, the network accuracy may returned to the desired accuracy level under floating point calculation.

More specifically, according to one aspect of the disclosure, it proposes a fixed-point training method for a floating point neural network. The method comprises: a fixed-point neural network obtaining step, for converting weights in said floating point neural network to fixed-point numbers, so as to obtain a corresponding fixed-point neural network; a fixed-point conversion scheme determining step, comprising: conducting a floating point forward calculation of said fixed-point neural network using a current data input in a training dataset, so as to obtain a current temporary fixed-point conversion scheme; comparing said current temporary fixed-point conversion scheme with a previous fixed-point conversion scheme, said previous fixed-point conversion scheme corresponding to a previous data input, and selecting an optimal fixed-point conversion scheme as an updated current fixed-point conversion scheme corresponding to the current data input; a fixed-point forward calculation step, for conducting a fixed-point forward calculation of said fixed-point neural network using said current data input based on said updated current fixed-point conversion scheme; and a neural network updating step, for updating said floating point neural network using the calculation result of said fixed-point forward calculation.

According to another aspect of the disclosure, it proposes a fixed-point training method for a floating point neural network. The method comprises: a fixed-point neural network obtaining step, for converting weights of said floating point neural network to fixed-point numbers, so as to obtain a fixed-point neural network; a first forward calculation step, for conducting a floating point forward calculation of said fixed-point neural network using a current data input of a training database, so as to obtain the value range of intermediate calculation results and generate a current temporary fixed-point conversion scheme; a fixed-point conversion scheme determining step, for comparing the current temporary fixed-point conversion scheme with a previous fixed-point conversion scheme, said previous fixed-point conversion scheme being determined by a previous data input of the training database, and selecting the fixed-point conversion scheme with a smaller decimal length as an updated current fixed-point conversion scheme; a second forward calculation step, for conducting a fixed-point forward calculation of said fixed-point neural network using said current data input based on said updated current fixed-point conversion scheme; a neural network updating step, for calculating a floating point gradient using the calculation result obtained in said second forward calculation step, and updating said floating point neural network using said floating point gradient.

According to yet another aspect of the disclosure, it proposes a fixed-point training apparatus for a floating point neural network. The apparatus comprises: a fixed-point neural network obtaining module, for converting weights in said floating point neural network to fixed-point numbers, so as to obtain a corresponding fixed-point neural network; a fixed-point conversion scheme determining module, comprising: a current temporary fixed-point conversion scheme determining unit, for conducting a floating point forward calculation of said fixed-point neural network using a current data input in a training dataset, so as to obtain a current temporary fixed-point conversion scheme; a scheme selecting unit, for comparing said current temporary fixed-point conversion scheme with a previous fixed-point conversion scheme corresponding to a previous data input, and selecting an optimal fixed-point conversion scheme as an updated current fixed-point conversion scheme corresponding to the current data input; a fixed-point forward calculation module, for conducting a fixed-point forward calculation of said fixed-point network using said current data input based on said updated current fixed-point conversion scheme; and a neural network updating module, for updating said floating point neural network using the calculation result of said fixed-point forward calculation.

It is to be understood that both the foregoing general description and the following detailed description are exemplary and explanatory only and are not limitations to the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 8 is an example of a fixed-point conversion scheme file according to the present disclosure;

Figure 1:
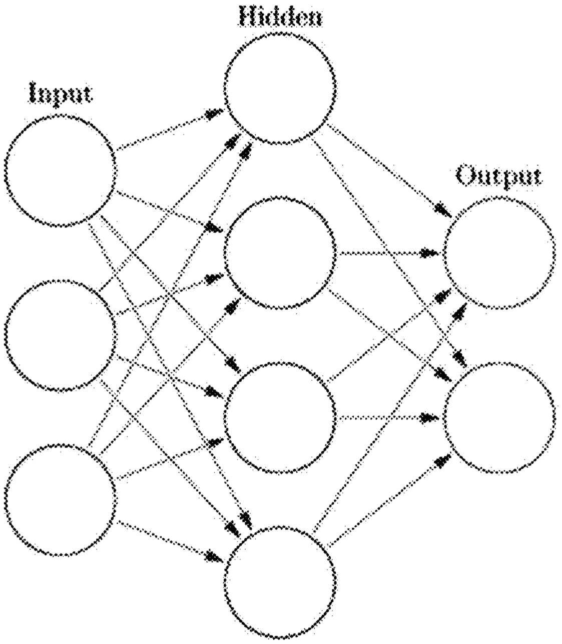
FIG. 1 shows a schematic diagram of a deep neural network.
Figure 2:
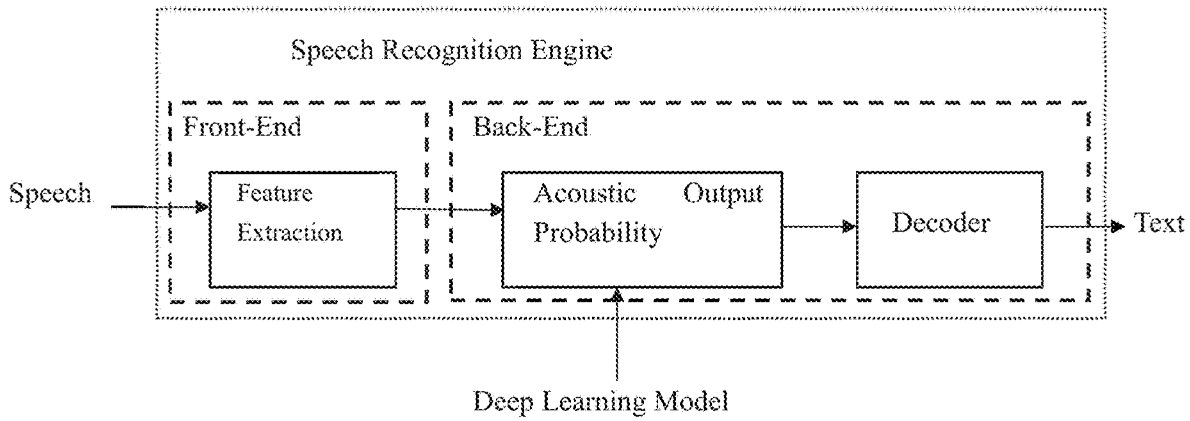
FIG. 2 shows an example of a speech recognition engine using deep neural networks.
Figure 3A:
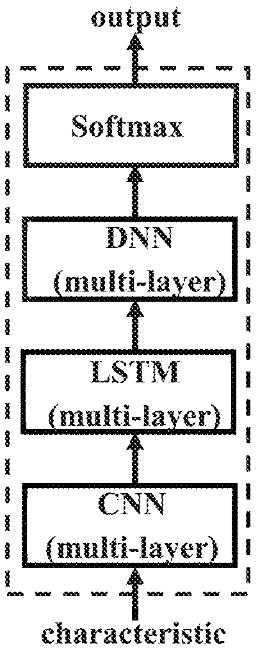
FIGS. 3*a* and 3*b* show a deep learning model applied in the speech recognition engine of FIG. 2.
Figure 3B:
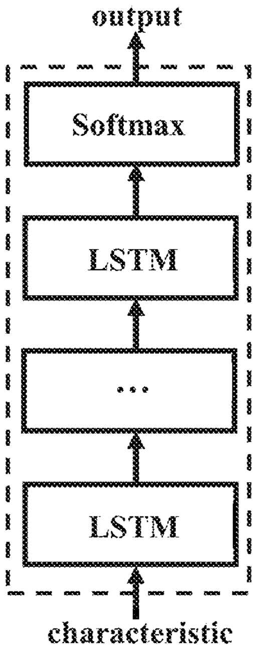
Figure 4:
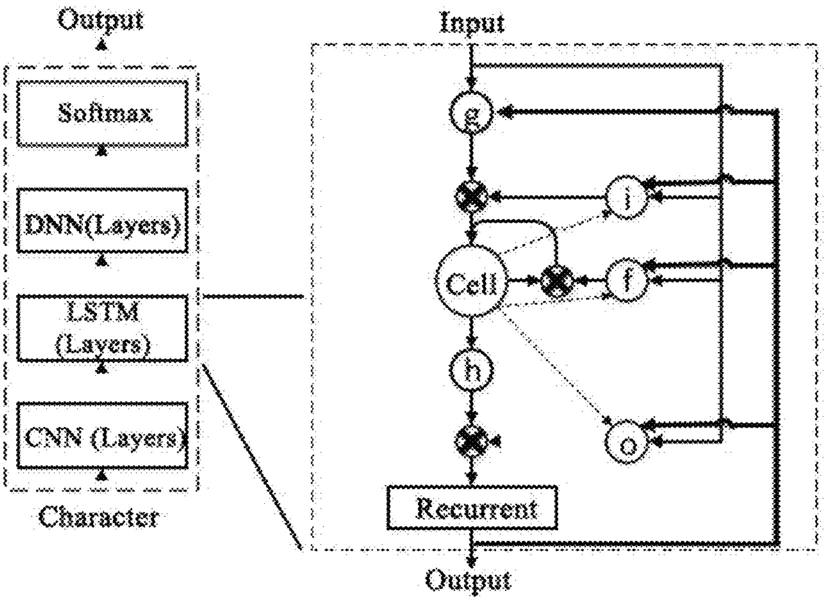
FIG. 4 shows a LSTM network model applied in speech recognition.
Figure 5:
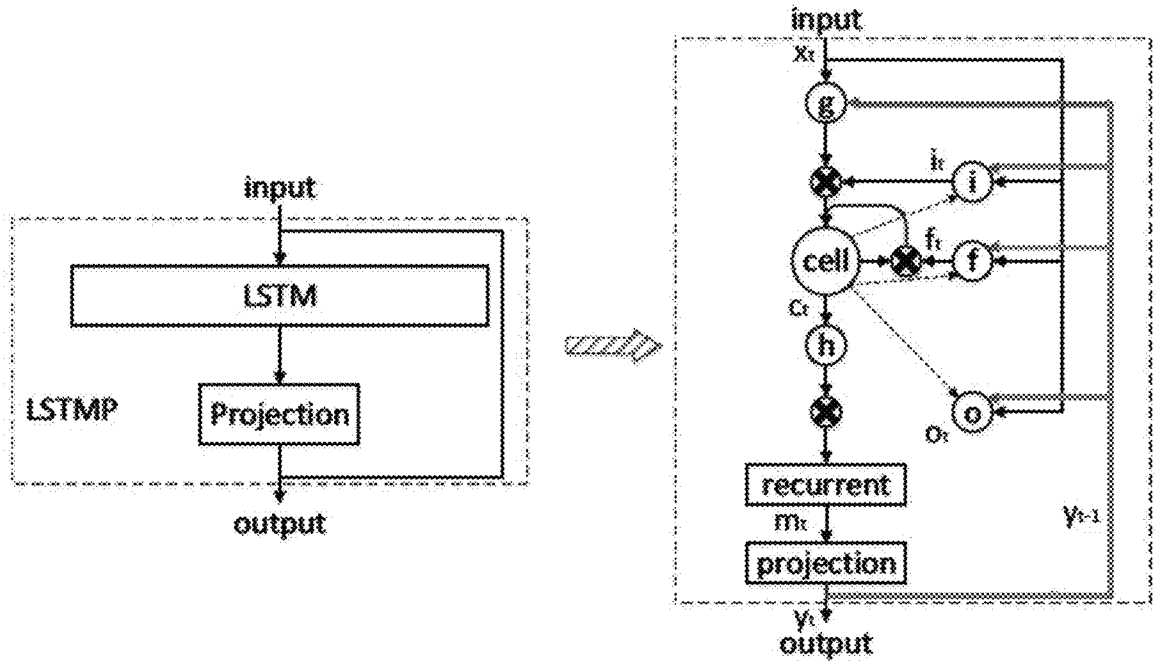
FIG. 5 shows an improved LSTM network model applied in speech recognition.
Figure 6:
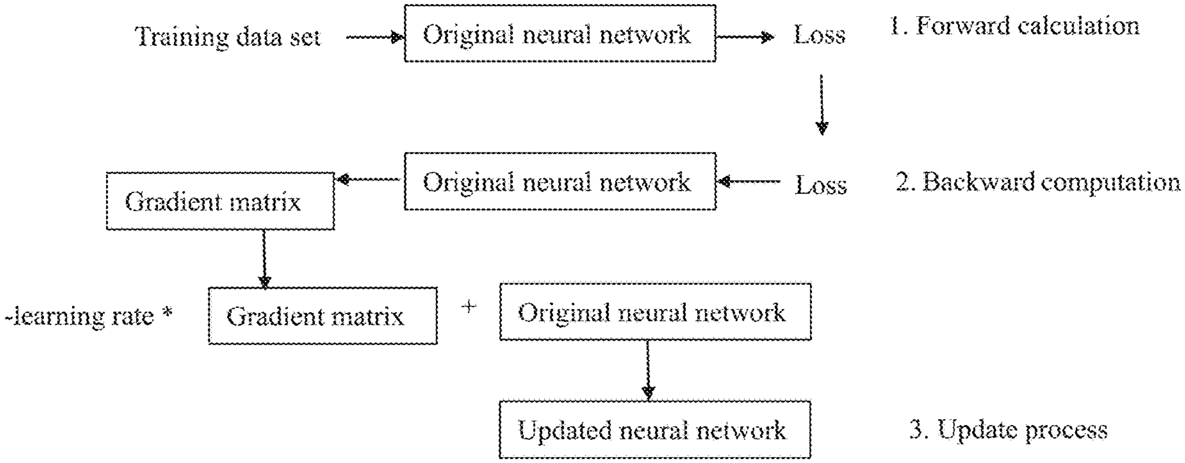
FIG. 6 is a schematic diagram showing the training/fine-tuning process of a neural network using the Gradient Descent Algorithm.
Figure 7:
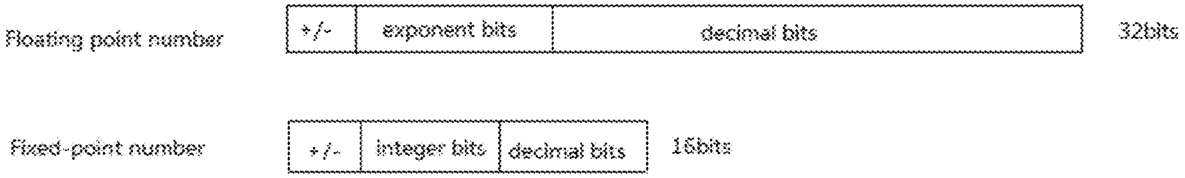
FIG. 7 is a simplified schematic diagram showing the conversion of floating point number to fixed-point number.

Specific embodiments in this disclosure have been shown by way of examples in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

EMBODIMENTS OF THE INVENTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

As mentioned above, in the hardware platform of deep neural network, it is desirable to use fixed-points with less bits to represent data and perform computations.

First of all, the method of converting a floating point number to a fixed-point number will be explained in detail.

In the present disclosure, fixed-point conversion generally includes: determining the number of bits to represent an integer, determining the number of bits to represent a decimal, and quantization of a floating number.

For LTSM networks, the data that needs to be converted includes: (i) weight parameters in the LSTM layers of the network, (ii) input data of the network, and (iii) data generated during the forward calculation process. Moreover, since forward calculation is conducted based on the weights of the network, the weight parameters are converted first, before the forward calculation. Then, the rest of the data are converted while simulating the forward calculation process on a hardware platform.

Therefore, different fixed-point conversion method may be used for different type of data, which may include (1)

converting single values, (2) converting the forward calculation process, and (3) converting activation functions.

Now, each fixed-point conversion method will be described in detail below.

Fixed-Point Conversion of Single Values

Converting single values to fixed-point numbers includes determining the length of integer bits, determining the length of decimal bits, and conducting fixed-point conversion.

For example, in order to convert a floating point number 0.7326 to a 16 bits fixed-point number, the following steps may take place:

First, it determines the sign bit, the length of integer bit and decimal bit.

Since the floating point number 0.7326 belongs to the interval $[-2^0, 2^0-2^{0-15}]$, therefore the corresponding fixed-point number will have 0 bit for integer bit, 15 bits for decimal bit, and 1 bit for sign bit.

Second, it converts the floating point number 0.732.6 according to the bit lengths determined above.

For the floating point number a, the corresponding fixed-point number a' is:

$$a' = \frac{\text{floor}(a \cdot 2^n)}{2^n}$$

wherein floor (x) means x is rounded down.

Therefore, for the floating point number 0.7326, the corresponding fixed-point number is:

$$\frac{\text{floor}(0.7326 \cdot 2^{15})}{2^{15}} = \frac{24005}{2^{15}} = 0.732574462$$

As can be seen, converting a float point number into a fixed-point number will bring an accuracy loss.

In the present embodiment, the signal value converting method will be applied to weights of the neural networks. In other words, the floating point weights in the trained floating-point neural network will be represented by approximate fixed-point numbers, so as to obtain a fixed-point neural network which can be used by the hardware platform.

The specific process for converting the weights of a floating point neural network is as follows:

First, it determines the value range of the weight matrices in the neural network, so as to determine the decimal bit length of the fixed-point number while ensuring that no overflow will occur. The maximum decimal bit length may be determined by the bit width limit and the value range of the parameters that need to be converted.

Assuming that the parameter to be converted is W, and the bit width limit of the fixed-point number is L, then the decimal bit length n shall guarantee that:

$$2^{L-1-n} > \max(|W|)$$

In theory, the larger n is, the smaller the accuracy loss caused by quantization will be.

Then, it converts the weights of the neural network, wherein the corresponding fixed-point number will have n bits for decimal, (L−1−n) bits for integer, and 1 bit for sign.

More specifically, the floating point number that needs to converted, x, will be multiplied by $2^n$ and then rounded. The obtained result is then divided by $2^n$, so as to obtain an approximate result after fixed-point conversion.

Each layer of the neural network contains a plurality of matrices (vectors), and the value range of each matrix differs greatly. Thus, it is proposed to obtain the value range of each matrix so as to determine respectively the decimal bit length of each matrix. In this way, the accuracy loss may be reduced significantly.

Fixed-Point Conversion of Forward Calculation Process

Converting the forward calculation process may include, for example, converting the results obtained from addition of floating point numbers, or multiplication of floating point numbers.

Take multiplication of floating point numbers for example, the specific fixed-point conversion process is as follows:

First, it uses single value converting method to determine the decimal bit length of the floating-point numbers a, b (assuming the decimal bit length of a, b are x, y respectively), and converting a, b respectively, so as to obtain a', b':

$$n' = \text{floor}(a \cdot 2^x)$$

$$b' = \text{floor}(b \cdot 2^y)$$

Then, it multiplies a' by b': c=a'·b';

Lastly, it converts the obtained result c to fixed-point number c'.

Assuming that the decimal bit length of c' is determined as z, then:

$$c' = \text{floor}\frac{c}{2^{x+y-z}}$$

For the present application, fixed-point calculation is used to simulate the calculation process in a hardware acceleration platform. Therefore, data generated during this calculation process needs to be converted to fixed-point numbers.

However, simulating the calculation process in a hardware platform does not necessarily mean to repeatedly enlarge or reduce each data involved in the calculation process. This is because each operation in the hardware platform is an operation of integers, therefore only the position of decimal point needs to be updated.

In the present disclosure, in order to facilitate computation, the position of decimal point for the same LSTM layer is identical, while the position of decimal point for different LSTM layers is different. This is because for different LSTM layers, the value range of data obtained during the forward calculation process may vary significantly.

The specific process for converting the forward calculation process is as follows:

First, it uses the single value conversion method to convert the weights of the neural network to fixed-point number. Then, the fixed-point network is multiplied by $2^n$ (wherein n is the decimal bit length), so as to obtain an integer.

Second, for an input matrix, it uses again the single value conversion method to determine corresponding decimal bit length based on the value range thereof. The input matrix is then enlarged and rounded. At this point, all data involved in the forward calculation process are now enlarged integers after fixed-point conversion.

Lastly, it converts the data obtained during the forward calculation process to fixed point numbers.

More specifically, for multiplication of two enlarged integers, assuming that the corresponding decimal bit length of each integer is respectively x and y, then the integer obtained after multiplication contains (x+y) decimal bits.

However, since the decimal bit length is limited to n (in this embodiment, for example), the obtained result needs to be divided $2^{(x+y-n)}$ and then rounded, so as to obtain an approximate value wherein the decimals after n bits are discarded.

For addition of two enlarged integers, since the decimal bit length of the same LSTM layer is identical, addition may be conducted directly.

By repeating the above-mentioned steps, all data obtained during the forward calculation process may be converted to fixed-point numbers.

It should be noted that, fixed-point conversion of weight parameters depends only on the neural network itself and does not depend on data sets. However, fixed-point conversion of intermediate calculation results depends on data sets. That is, different fixed-point conversion schemes may be obtained when using different data sets to conduct forward calculation of a same neural network.

Fixed-Point Conversion of Activation Functions

For activation functions used in the forward calculation of LSTM network, it uses look-up table to convert the activation functions to fixed-point numbers.

According to the characteristics of the activation functions, if the input is very small or very large, the obtained function value approaches the minimum value or the maximum value. Therefore, it needs only to ensure the accuracy of computation result within an interval where the function changes rapidly.

The specific process for converting the activation functions is as follows:

First, it divides a predetermined input interval in equidistant, and calculates the corresponding output so as to create a look-up table.

Then, during use, it matches each input to a corresponding interval and takes the left value, and then searches for the corresponding output in the look-up table.

In the present embodiment, since sigmoid takes the value 0.9997 at x=8, and tan h takes the value 0.9993 at x=4, the input interval of the two look-up tables may be defined respectively as [−8,8] for sigmoid and [−4,4] for tan h. Then, the above intervals may be equally divided to 2048 sections, and the corresponding output value may be calculated. In this way, the look-up tables may be constructed. For an input outside the interval, the corresponding output may be the maximum output or minimum output of the input interval.

According to the above-mentioned fixed-point conversion methods, corresponding fixed-point conversion schemes may be determined.

In one example, the fixed-point conversion scheme may be determined coarse-grained. That is, $W_{ix}$, $W_{fx}$, $W_{cx}$, $W_{ox}$ may be converted and stored together as a group, and so are $W_{ir}$, $W_{fr}$, $W_{cr}$, $W_{or}$ as converted and stored together as another group.

In another example, the fixed-point conversion scheme may be determined fine-grained. That is, $W_{ix}$, $W_{fx}$, $W_{cx}$, $W_{ox}$, $W_{ir}$, $W_{fr}$, $W_{cr}$, $W_{or}$ may be individually converted and stored.

FIG. 8 is an example of a fixed-point conversion scheme file according to the present disclosure. The fixed-point conversion scheme file shown in FIG. 8 may be used to represent coarse-grained fixed-point conversion schemes, as well as fine-grained fixed-point conversion schemes.

In the fixed-point conversion scheme file shown in FIG. 8:

The first line is the name of the fixed-point conversion scheme.

The second line <Model> indicates that the fixed-point conversion scheme begins.

<BitNumParam> represents the bit width limit of weights of the neural network, wherein <Component> represents the layer of the neural network.

In FIG. 8, <Component> 0, <Component> 1, <Component> 2 represent respectively the bit width of weight matrix/vector of the three LSTM layers, each of which contains 13 parameters: $W_{gx}$, $W_{ix}W_{fx}$, $W_{or}$, $W_{rr}$, $W_{ir}$, $W_{fr}$, $W_{or}$, or bias $W_{ic}$, $W_{fc}$, $W_{oc}$, $W_{rm}$. <Component> 3 represents the bit width of the weight matrix/vector after an affine transformation, which consists of two parameters: W, Bias.

<BitNumBlob> represents the bit width limit of intermediate calculation result during the calculation process.

In FIG. 8, <Layer> 0 represents the bit width of the input vector of the neural network. <Layer> 1, <Layer> 2, <Layer> 3 represent respectively the bit width of intermediate calculation result of the three LSTM layers, each of which contains three parameters: $y_t$, $m_t$, blob (including $i_t$, $f_t$, $c_t$, $o_t$, $h_t$ and a series of intermediate calculation results). In addition, $y_t$ of one layer is equivalent to the input $x_t$ of the following layer. Therefore, <Layer> 4 represents the bit width of the output $y_t$ of the affine transformation layer.

<FragPosParam> represents the decimal bit length of weights of the neural network, the specific description of which is similar to that of the above-mentioned the bit width limit.

<FragPosBlob> represents the decimal bit length of intermediate calculation result.

Xrange, npoints, expo store look-up tables, i.e., the absolute value of the input interval of the two activation functions, sigmoid and tan h, the number of interval sections, and the decimal bit length.

Embodiment 1

As mentioned above, fixed-point calculations will result in accuracy loss. Moreover, by adjusting merely the fixed-point conversion schemes, the required network accuracy cannot be achieved. Thus, in the present application, efforts are made to train or retrain the deep neural network under fixed-point calculation environment, thereby compensating for the losses caused by fixed-point calculation.

Figure 9:
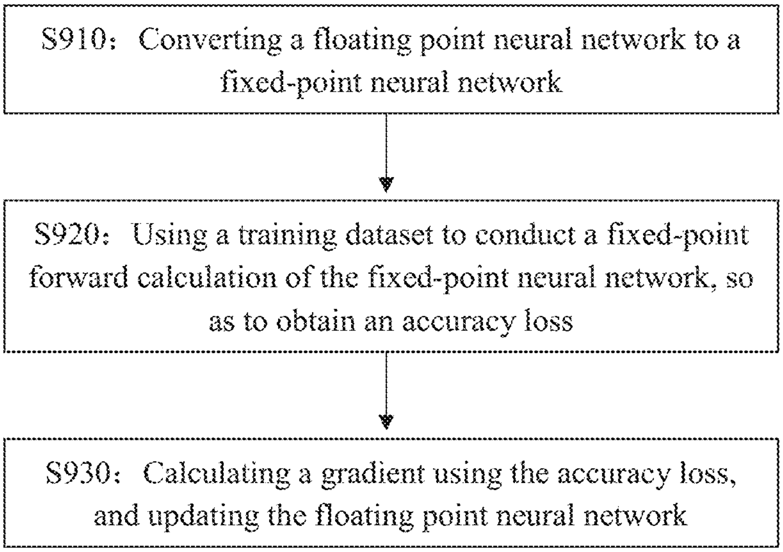
FIG. 9 shows the specific steps of the fixed-point training method according to the present disclosure.

FIG. 9 shows the specific steps of a fixed-point training method according to the present disclosure.

As can be seen from FIG. 9, in Step 910, it converts weights of a trained deep neural network (e.g., LSTM network) to fixed-point numbers using the single value fixed-point conversion method described above, so as to obtain a fixed-point neural network.

In Step 920, it uses a training data set to conduct a fixed-point forward calculation of the fixed-point neural network obtained in Step 910. Then, it compares the calculated result with a standard value (Ground truth) to obtain the accuracy loss. Here, the standard value refers to the corresponding reference standard for the training data set. The standard value is used to calculate the loss.

In Step 930, it updates the original floating point neural network according to the loss obtained in Step 920.

More specifically, in Step 931, it calculates the floating point gradient via a backward calculation based on the loss and the original floating point neural network.

In Step 932, it updates the weight matrix of the original floating point neural network based on the floating point gradient and a learning rate.

The above Steps 910 to 930 are performed iteratively until the floating point neural network achieves the desired accuracy.

In this method, adopting the fixed-point forward calculation, the forward calculation process during the training process is equivalent to the fixed-point calculation process in actual practice. Accordingly, the calculation error is the difference between the result of fixed-point calculation and the actual result. Thus, the neural network may be adjusted so as to be more adaptable to fixed-point calculation.

On the other hand, adopting a floating point backward calculation ensures that the update value of the neural network is a floating point number. Accordingly, the update of the neural network may be more accurate.

With this method, the forward calculation process may be similar to the fixed-point calculation process of a hardware acceleration platform. Accordingly, the neural network may achieve higher accuracy under fixed-point calculation environment via fixed-point training.

Embodiment 2

Since the calculation process of a deep neural network (for example, LSTM neural network) is rather complicated, it is difficult to determine the fixed-point conversion scheme directly before calculation.

Therefore, in this further embodiment, it proposes a fixed-point training method based on a dynamic fixed-point conversion scheme.

Figure 10:
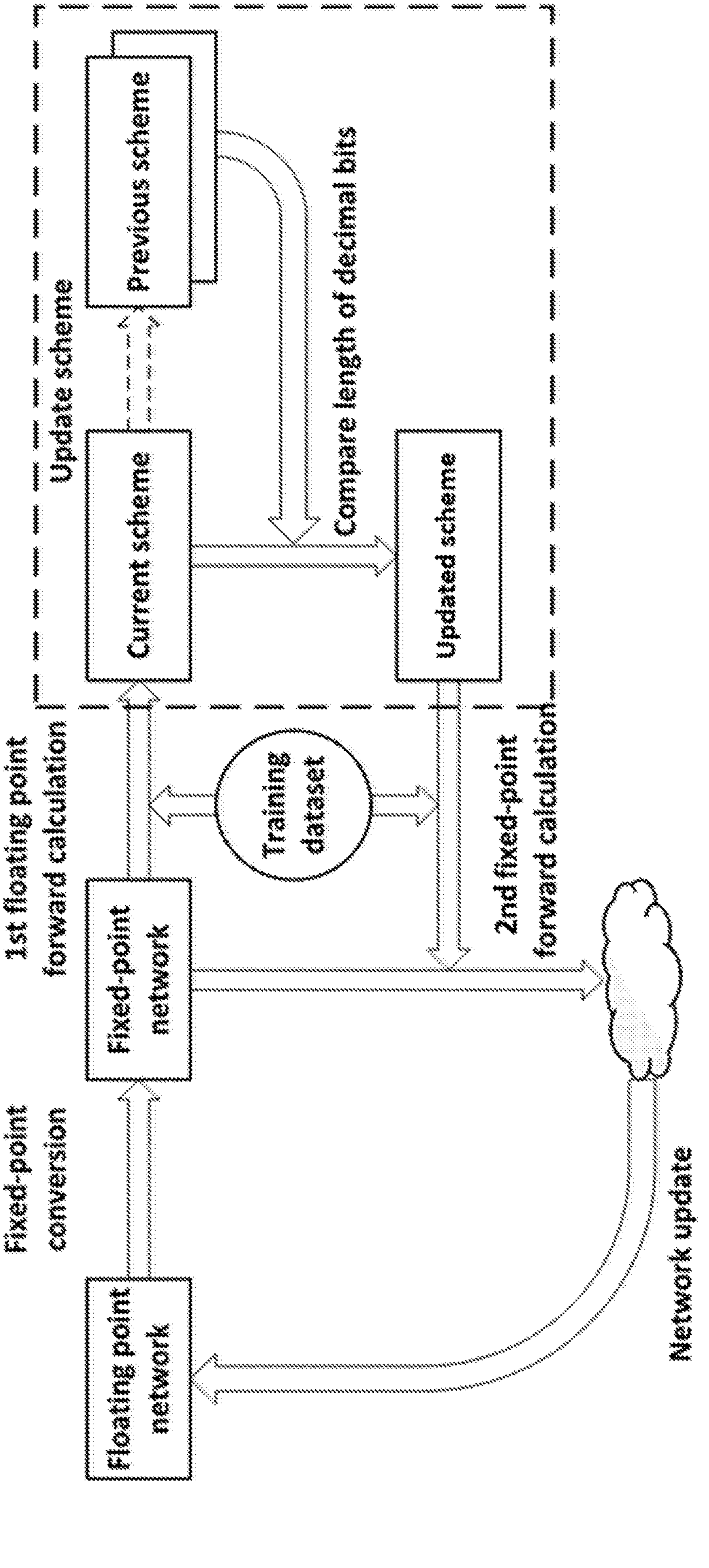
FIG. 10 is a schematic diagram showing the fixed-point training method based on dynamic fixed-point conversion scheme according to the present disclosure.

FIG. 10 is a schematic diagram showing the fixed-point training method based on a dynamic fixed-point conversion scheme according to the present disclosure.

As can be seen in FIG. 10, firstly, it converts weights of the neural network to fixed-point numbers so as to obtain a fixed-point neural network.

Then, it uses each data piece in a training data set to conduct a first floating point forward calculation of the fixed-point neural network, so as to obtain the value range of the intermediate calculation data. Based on this value range, it generates and stores the current fixed-point conversion scheme.

Next, it compares the current fixed-point conversion scheme with the fixed-point conversion scheme of the previous data piece, so as to generate an updated fixed-point conversion scheme.

Based on the updated fixed-point conversion scheme, it uses the current data piece again to conduct a fixed-point forward calculation of the fixed-point neural network. Lastly, it calculates the floating point gradient so as to update the floating point neural network.

Figure 11:
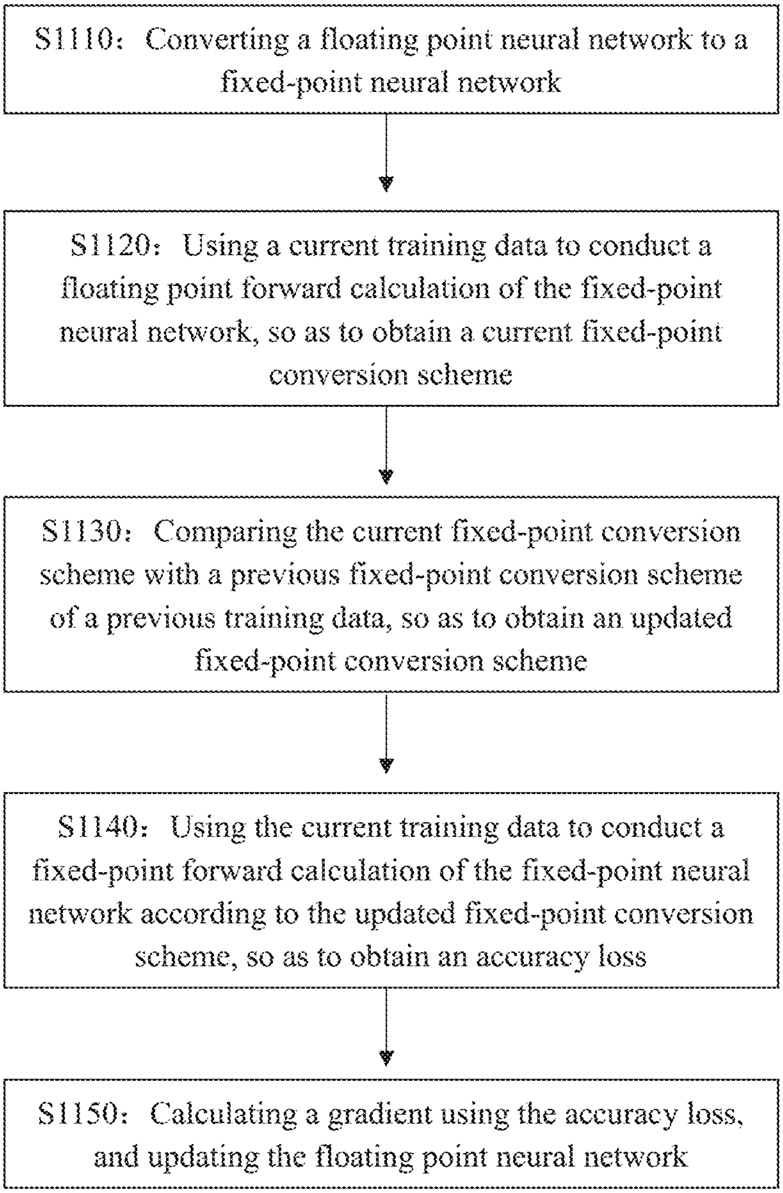
FIG. 11 shows the specific steps of the fixed-point training method of FIG. 10.

FIG. 11 shows the specific steps of the fixed-point training method based on dynamic fixed-point conversion scheme.

As can be seen in FIG. 11, in Step 1110, it converts weights of the original neural network to fixed-point numbers, so as to obtain a fixed-point neural network. For example, the above-mentioned single value conversion method may be adopted.

In Step 1120, it uses a current data piece in a training set to conduct a first floating point forward calculation of the fixed-point neural network obtained in Step 1110.

It has already converted the weights of the neural network to fixed-point numbers in Step 1110, but it has not converted the intermediate calculation results to fixed-point numbers. By conducting the floating point forward calculation of Step 1120, the value range of the intermediate calculation results may be obtained. Accordingly, the above-mentioned conversion method for forward calculation process may be adopted, so as to generate a corresponding fixed-point conversion scheme.

In Step 1130, it compares the current fixed-point conversion scheme with the previous fixed-point conversion scheme, wherein said previous fixed-point conversion scheme being determined using the previous data piece, so as to determine an updated fixed-point conversion scheme.

In the present embodiment, the fixed-point conversion scheme with a smaller decimal bit length is selected as the updated fixed-point conversion scheme. Accordingly, it may ensure that there will be no overflow due to a large decimal bit length.

In another embodiment, it is also possible to set an overflow tolerance limit in advance, that is, to set a maximum decimal bit length in advance. Accordingly, in Step 1130, the fixed-point conversion scheme with a larger decimal bit length within the overflow tolerance limit may be selected as the updated fixed-point conversion scheme, so as to increase fixed-point calculation accuracy. It should be understood that the updated fixed-point conversion scheme may be selected according to other criteria, which are also included in the scope of the present application.

In Step 1140, based on the updated fixed-point conversion scheme, it uses the current data piece to conduct a second fixed-point forward calculation of the fixed-point neural network obtained in Step 1110. Then, it compares the calculated result with a standard value, so as to obtain an accuracy loss.

More specifically, the current data piece of the training data set and the intermediate calculation result of the second forward calculation are converted to fixed-point numbers according to the updated fixed-point conversion scheme. That is, the decimal bit length of the fixed-point numbers are determined according to the updated fixed-point conversion scheme. Accordingly, all data involved in the forward calculation process are converted to fixed-point numbers, thus simulating the fixed-point calculation process of a hardware acceleration platform.

In Step 1150, it calculates a floating point gradient using the loss obtained in Step 1140, and then updates the floating point neural network using the gradient and a predetermined learning rate.

The above Steps 1110 to 1150 are performed iteratively until the floating point neural network achieves the desired accuracy.

In one example, the process described above may be applied to a neural network for predicting voice input. The specific steps are as follows:

First, it converts weights of the original neural network to fixed-point numbers, so as to obtain a fixed-point neural network.

Second, it uses the $n^{th}$ voice data in a voice training set to conduct a first floating point forward calculation of the fixed-point neural network. Then, it determines a fixed-point conversion scheme $S(n')$ for the $n^{th}$ voice data based on the value range of the calculation result.

Third, it compares the fixed-point conversion scheme $S(n')$ for the $n^{th}$ voice data with the fixed-point conversion scheme $S(n-1)$ for the $n-1^{th}$ voice data, and selects the scheme with smaller decimal bit length as the updated fixed-point conversion scheme $S(n)$ for the $n^{th}$ voice data.

Fourth, it uses again the $n^{th}$ voice data to conduct a fixed-point forward calculation of the fixed-point network, based on the updated fixed-point conversion scheme $S(n)$ for the $n^{th}$ voice data. Then, it compares the calculation result with a standard value to obtain an accuracy loss.

Lastly, it calculates the floating point gradient based on the loss, so as to update the floating point network.

The above-mentioned steps are performed iteratively until the neural network achieves the desired accuracy.

Beneficial Technical Effects

In early stage of training, the value range of the weights and the intermediate calculation results of the original neural network is relatively large. Therefore, a single fixed-point conversion scheme determined in advance might be inappropriate, leading to overflow during calculation. The advantage of the method of the present application lies in that by keeping the fixed-point conversion scheme for the previous training data piece, it may effectively avoid the problem of overflow.

Therefore, the method of the present application may be applied in fine-tuning of a trained neural network, as well as in training of an original neural network. After a certain training/fine-tuning epochs, a neural network suitable for fixed-point calculation may be obtained, improving the prediction accuracy of fixed-point calculation of the neural network.

It should be understood that although the above-mentioned embodiments use LSTM neural networks as examples of the present disclosure, the present disclosure is not limited to LSTM neural networks, but can be applied to various other neural networks as well.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A fixed-point training method for a floating point neural network, comprising a fixed-point neural network obtaining step, for converting weights in said floating point neural network to fixed-point numbers, so as to obtain a corresponding fixed-point neural network;

a fixed-point conversion scheme determining step, comprising:

conducting a floating point forward calculation of said fixed-point neural network using a current data input in a training dataset, so as to obtain a current temporary fixed-point conversion scheme;

comparing said current temporary fixed-point conversion scheme with a previous fixed-point conversion scheme, said previous fixed-point conversion scheme corresponding to a previous data input, and selecting an optimal fixed-point conversion scheme as an updated current fixed-point conversion scheme corresponding to the current data input such that said updated current fixed-point conversion scheme reduces a number of overflow instances in a fixed-point forward calculation of said fixed-point neural network using said current data input based on said updated current fixed-point conversion scheme;

a fixed-point forward calculation step, for conducting a fixed-point forward calculation of said fixed-point neural network using said current data input based on said updated current fixed-point conversion scheme; and a neural network updating step, for updating said floating point neural network using the calculation result of said fixed-point forward calculation.

2. The method according to claim 1, further comprises: executing iteratively said fixed-point neural network obtaining step, said fixed-point conversion scheme determining step, said fixed-point forward calculation step and said neural network updating step, until the floating point neural network achieves a desired accuracy.

3. The method according to claim 1, wherein said fixed-point conversion scheme at least includes: the total bit length and the decimal bit length of a fixed-point number used for representing a corresponding floating point number.

4. The method according to claim 1, wherein said fixed-point neural network obtaining step further comprises: converting weights of said floating point neural network to fixed-point numbers by a rule of fixed-point conversion of floating point number.

5. The method according to claim 1, wherein in said fixed-point conversion scheme determining step, the fixed-point conversion scheme with a smaller decimal bit length is selected as the optimal scheme.

6. The method according to claim 1, wherein said fixed-point forward calculation step further comprises: converting the input data used for forward calculation and intermediate calculation results of said forward calculation to fixed-point numbers on the basis of said updated current fixed-point conversion scheme.

7. The method according to claim 1, wherein said floating point neural network updating step further comprises:

comparing calculation result of said fixed-point forward calculation with a standard value to obtain an accuracy loss; and calculating a floating point gradient based on said accuracy loss, and updating said floating point neural network based on said floating point gradient.

8. The method according to claim 1, wherein said method is used for conducting a fixed-point fine-tuning for a trained floating point neural network.

9. The method according to claim 1, wherein said method is used for conducting a fixed-point training for a raw floating point neural network.

10. The method according to claim 1, wherein said floating point neural network is an LSTM neural network.

11. The method according to claim 1, wherein said training dataset is a voice dataset.

12. A fixed-point training method for a floating point neural network, comprising a fixed-point neural network obtaining step, for converting weights of said floating point neural network to fixed-point numbers, so as to obtain a fixed-point neural network;

a first forward calculation step, for conducting a floating point forward calculation of said fixed-point neural network using a current data input of a training database, so as to obtain the value range of intermediate calculation results and generate a current temporary fixed-point conversion scheme;

a fixed-point conversion scheme determining step, for comparing the current temporary fixed-point conversion scheme with a previous fixed-point conversion scheme, said previous fixed-point conversion scheme being determined by a previous data input of the training database, and selecting the fixed-point conversion scheme with a smaller decimal length as an updated current fixed-point conversion scheme such that said updated current fixed-point conversion scheme reduces a number of overflow instances in a fixed-point forward calculation of said fixed-point neural network using said current data input based on said updated current fixed-point conversion scheme;

a second forward calculation step, for conducting a fixed-point forward calculation of said fixed-point neural network using said current data input based on said updated current fixed-point conversion scheme;

a neural network updating step, for calculating a floating point gradient using the calculation result obtained in said second forward calculation step, and updating said floating point neural network using said floating point gradient.

13. The method according to claim 12, further comprises: executing iteratively said fixed-point neural network obtaining step, said first forward calculation step, said fixed-point conversion scheme determining step, said second forward calculation step and said neural network updating step, until the floating point neural network reaches a desired accuracy.

14. A fixed-point training apparatus for a floating point neural network, comprising a fixed-point neural network obtaining module, for converting weights in said floating point neural network to fixed-point numbers, so as to obtain a corresponding fixed-point neural network;

a fixed-point conversion scheme determining module, comprising:

a current temporary fixed-point conversion scheme determining unit, for conducting a floating point forward calculation of said fixed-point neural network using a current data input in a training dataset, so as to obtain a current temporary fixed-point conversion scheme;

a scheme selecting unit, for comparing said current temporary fixed-point conversion scheme with a previous fixed-point conversion scheme corresponding to a previous data input, and selecting an optimal fixed-point conversion scheme as an updated current fixed-point conversion scheme corresponding to the current data input such that said updated current fixed-point conversion scheme reduces a number of overflow instances in a fixed-point forward calculation of said fixed-point neural network using said current data input based on said updated current fixed-point conversion scheme;

a fixed-point forward calculation module, for conducting a fixed-point forward calculation of said fixed-point network using said current data input based on said updated current fixed-point conversion scheme; and a neural network updating module, for updating said floating point neural network using the calculation result of said fixed-point forward calculation.

15. The apparatus according to claim 14, wherein said fixed-point conversion scheme includes: the total bit length and the decimal bit length of a fixed-point number used for representing a corresponding floating point number.

16. The apparatus according to claim 14, wherein said scheme selecting unit is configured to select the fixed-point conversion scheme with a smaller decimal bit length as the optimal scheme.

17. The apparatus according to claim 14, wherein said fixed-point neural network obtaining module is configured to convert weights of said floating point neural network to fixed-point numbers by a rule of fixed-point conversion of floating point number.

18. The apparatus according to claim 14, wherein said fixed-point forward calculation module is configured to convert the input data used for forward calculation and intermediate calculation results of said forward calculation to fixed-point numbers on the basis of said updated current fixed-point conversion scheme.

19. The apparatus according to claim 14, wherein said neural network updating step further comprises:

a comparing unit, for comparing the calculation result of said fixed-point forward calculation with a standard value to obtain an accuracy loss; and an updating unit, for calculating a floating point gradient based on said accuracy loss, and updating said floating point neural network based on said floating point gradient.

20. The apparatus according to claim 14, wherein said apparatus is used for conducting a fixed-point fine-tuning for a trained floating point neural network.

21. The apparatus according to claim 14, wherein said apparatus is used for conducting a fixed-point training for a raw floating point neural network.

* * * * *